July 26, 1960 M. C. KIDD 2,946,858
CONVERTIBLE SELF-BIASING OR AMPLIFYING
CIRCUIT FOR MAGNETIC RECORDING
OR REPRODUCING
Filed Dec. 30, 1954
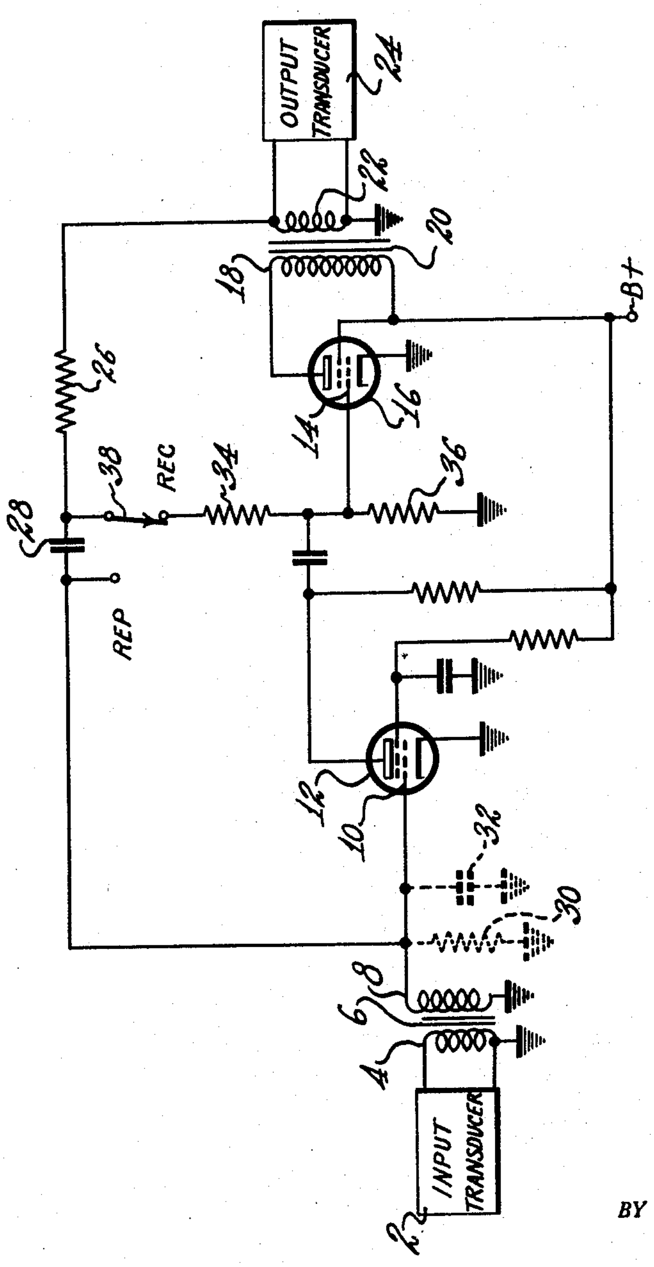
INVENTOR.
MARSHALL C. KIDD
BY Morris A. Rabkin
ATTORNEY United States Patent Office
2,946,858
Patented July 26, 1960

2,946,858

CONVERTIBLE SELF-BIASING OR AMPLIFYING CIRCUIT FOR MAGNETIC RECORDING OR REPRODUCING

Marshall C. Kidd, Haddon Heights, N.J., assignor to Radio Corporation of America, a corporation of Delaware Filed Dec. 30, 1954, Ser. No. 478,657

5 Claims. (Cl. 179—100.2)

This invention relates to magnetic recording, and more particularly to a magnetic recording and reproducing system wherein the recording bias is supplied by the recording amplifier.

In the art relating to the recording of magnetic intelligence signals on a magnetizable record member, it has been found advantageous to superimpose a high frequency oscillatory bias signal on the intelligence signal during the recording process. Such oscillatory bias signals assist, in a manner well known in the art, in effecting the desired magnetization of the record member. Heretofore, such bias voltage has been supplied by oscillatory circuits separate from the recording amplifier.

It is an object of the present invention to provide an improved magnetic recording and reproducing system wherein, during the recording operation, the bias signal is developed within the amplifier and superimposed upon the intelligence signal.

It is another object of the present invention to provide an improved magnetic recording and reproducing system as set forth wherein the recording amplifier is caused to oscillate at a superaudible frequency.

In accomplishing these and other objects, there has been provided, in accordance with the present invention, a reactive network coupled in positive feedback relationship with the recording amplifier to cause the amplifier to oscillate at a predetermined high frequency. A resistive network is also coupled in negative feedback relationship with the amplifier to stabilize the operation thereof.

A better understanding of this invention may be had from the following detailed description when read in connection with the accompanying drawing in which the single figure is a schematic representation of a magnetic recording and reproducing system embodying the present invention.

Referring now to the drawing in more detail, it will be seen that there has been provided an input transducer 2 which, during the recording operation, may be considered as a microphone and, during the reproduction or playback operation, may be considered as a magnetic pickup transducer. The input transducer 2 is coupled to the primary winding 4 of an input transformer 6. The secondary winding 8 of the transformer 6 is connected to the control grid 10 of a first amplifier tube 12. The output of the first amplifier tube 12 is connected to the control grid 14 of a second or power amplifier tube 16. The output of the power amplifier 16 is fed to the primary winding 18 of an output transformer 20. The secondary winding 22 of the output transformer is connected to energize an output transducer 24. As noted with respect to the input transducer, the output transducer may also be considered as either of two different types of apparatus. When the system is energized to operate as a recording device, the output transducer may be considered as a magnetic recording head. On the other hand, when the device is conditioned to be operated as a reproducing device, the output transducer may be considered as a loud-speaker.

The secondary winding 22 of the output transformer 20 is coupled to the input or control grid 10 of the first amplifier through a reactive network including a first resistor 26 serially connected with a capacitor 28. The distributed resistance and capacitance which must be also considered in the reactive network are schematically represented and shown in phantom on the drawing as resistor 30 and capacitor 32. A negative feedback loop couples the secondary 22 of the output transformer 20 to the input of the power amplifier 16. This negative feedback network includes the first resistor 26, a second resistor 34 and a third resistor 36. The first and second resistors form one leg of a voltage divider while the third resistor 36 forms the other leg. It will be noted that a switch 38 is positioned between the first and second resistors and is operative to condition the system for recording by connecting these two resistors serially. However, when it is desired to condition the system to operate as a reproducing circuit, the switch is moved to open the circuit between the first and second resistors to a position where it short circuits the first capacitor 28. In this latter condition, the negative feedback circuit is opened and the positive feedback circuit network is detuned.

Assuming for the moment that it is desired to record certain signals, these signals are applied to the input transducer 2 from which they are fed to the amplifier for amplification thence to the output transducer. The switch 38 is closed in the position shown keeping the negative feedback circuit in this condition. The positive feedback circuit is reactive and together with the amplifier will cause the amplifier to oscillate at a frequency determined by the value of the first resistor 26, the capacitor 28 and the equivalent value of the distributed resistance and capacitance represented by resistor 30 and capacitor 32 respectively. The frequency of oscillation for the network is approximately $$F=\frac{1}{2\pi\sqrt{R_1R_2C_1C_2}}$$

where $R_1$ is the resistance of the first resistor 26, and
$C_1$ is the capacitance of the capacitor 28.
$R_2$ is the equivalent value of the distributed resistance represented by the resistor 30, and
$C_2$ is the equivalent capacitance of the distributed capacitance represented by the capacitor 32.

At the particular frequency determined by those values set forth in the equation, the output of the amplifier will be fed back to the input thereof in proper phase relationship to establish a relatively stable oscillation. Proper choice of components as determined by the foregoing equation will produce oscillations within the amplifier which are of a superaudible frequency and will not appreciably traverse with the amplification of the intelligence signals. Instead these audible oscillations will be superimposed upon the intelligence signal within the amplifier as it is being amplified. This superimposition of the superaudible signals upon the intelligence signals fulfills the requirement of supplying high frequency recording bias to the output transducer simultaneously with the intelligence signal. The negative feedback circuit is resistive and, therefore, is not tuned to any particular frequency. It serves the dual purpose of tending to limit the amplitude of the oscillatory signal while at the same time tending to reduce any distortions in the intelligence signal which is applied to the power amplifier. In this manner, the negative feedback circuit tends generally to stabilize the operation of the amplifier including the positive feedback arrangement. When the switch 38 is moved to open, the negative feedback circuit to the position whereat the capacitor 28 is short circuited, the system is conditioned for operation as a signal reproducer. The shorting of the capacitor, as before mentioned detunes the positive feedback circuit and thereby reduces the amount of feedback below that which would cause the amplifier to break into oscillation. Thus in reproducing operations, the small amount of positive feedback enhances the gain of the amplifier without producing the oscillations which are found desirable during the recording process. It will also be appreciated that although the system has been described as including vacuum tube amplifier circuits, the system is equally applicable to a transistor or semiconductor amplifier circuits. It will further be appreciated that although the positive feedback loop is represented as being one exhibiting capacitive reactance feedback circuits revolving inductive reactance are also suitable for use in the positive feedback circuit.

Thus there has been provided an improved magnetic recording-reproducing system wherein a stabilized high frequency bias is superimposed upon intelligence signals without the necessity of providing an oscillatory oscillator, the oscillatory bias energy being developed within the amplifier.

What is claimed is:

1. A magnetic record translating system comprising, in combination, an amplifier having an input circuit and an output circuit, means for applying intelligence signals to said input circuit, means operable to condition said system for recording of said intelligence signals, said conditioning means including a reactive element, means for coupling said reactive element in positive feedback relation with said amplifier between said input circuit and said output circuit thereof for rendering said amplifier oscillatory at a predetermined frequency higher than the frequency of said intelligence signals to provide recording bias signals superimposed upon said intelligence signals in said amplifier, said conditioning means also including a resistive element, means for simultaneously coupling said resistive element between said input circuit and said output circuit in negative feedback relation with said amplifier for stabilizing said amplifier, and means connected to said output circuit for applying said superimposed bias and intelligence signals to the magnetic record for recording thereon.

2. A magnetic record translating system, comprising, in combination, an amplifier having an input circuit and an output circuit, an input transducer coupled to said input circuit for applying intelligence signals to said amplifier for amplification therein, an output transducer coupled to said output circuit for alternatively recording and reproducing said amplified signals, a resistive circuit element, a reactive circuit element, a network connected between said input circuit and said output circuit operative to condition said system for recording of said intelligence signals on said magnetic record, said network having a reactive branch including said reactive circuit element coupled in positive feedback relation with said amplifier for rendering said amplifier oscillatory at a predetermined high frequency to provide recording bias signals superimposed upon said intelligence signals in said amplifier, said network also having resistive branch including said resistive circuit element coupled in negative feedback relation to said amplifier for stabilizing said amplifier.

3. A magnetic record translating system in accordance with claim 2 wherein said reactive element is a capacitor having a value for cooperation with other elements in said network to render said amplifier oscillatory at said predetermined frequency, and wherein said resistive element is a resistor.

4. A magnetic record translating system in accordance with claim 2 including switch means connected in said network between said resistive branch and said reactive branch simultaneously operative to open said resistive branch and short circuit said reactive branch.

5. A magnetic record translating system, comprising, in combination, a first amplifier having an input circuit and an output circuit, a second amplifier having an input circuit and an output circuit, said output circuit of said first amplifier being connected to the input circuit of said second amplifier for cascading said amplifiers, a pickup transducer connected to said input circuit of said first amplifier, an output transducer connected to the output circuit of said second amplifier, a feedback network connected between the output circuit of said second amplifier and the input circuit of said first and said second amplifiers, said feedback network including a resistor and a capacitor connected in series with each other, said resistor being connected to said output circuit of said second amplifier, said capacitor being connected to said input circuit of said first amplifier for rendering said cascaded amplifiers oscillatory at a frequency determined by the values of said capacitor and said resistor to provide a bias signal superimposed upon the signal from said pickup transducer, another resistor connected between the junction of said first named resistor and capacitor and said input circuit of said second amplifier for providing a negative feedback path around said second amplifier for effecting stabilization thereof.

References Cited in the file of this patent

UNITED STATES PATENTS

| | | |
|---|---|---|
| 2,540,299 | Shoup et al. | Feb. 6, 1951 |
| 2,641,655 | Bobb | June 9, 1953 |
| 2,654,003 | Dashiell | Sept. 29, 1953 |

FOREIGN PATENTS

| | | |
|---|---|---|
| 880,550 | France | Mar. 25, 1942 |